US012610313B2

(12) United States Patent
Anderson et al.

(10) Patent No.: US 12,610,313 B2
(45) Date of Patent: Apr. 21, 2026

(54) SYSTEM AND METHOD FOR MANAGING WIRELESS CONNECTIONS FOR A VEHICLE

(71) Applicant: GM Global Technology Operations LLC, Detroit, MI (US)

(72) Inventors: Esther Anderson, Canton, MI (US); Chuan Li, Troy, MI (US); Fan Bai, Ann Arbor, MI (US); Jace C. Stokes, Highland, MI (US); Andrew W. Averhart, Redford, MI (US); Adam Slifco, Farmington Hills, MI (US); Anil Patil, Troy, MI (US); Eric E. Chapiewski, New Baltimore, MI (US); Avichay Karpel, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 18/497,100

(22) Filed: Oct. 30, 2023

(65) Prior Publication Data

US 2025/0142465 A1    May 1, 2025

(51) Int. Cl.
| | |
|---|---|
| *H04W 48/20* | (2009.01) |
| *H04L 5/00* | (2006.01) |
| *H04W 28/18* | (2009.01) |

(52) U.S. Cl.
CPC ........... *H04W 48/20* (2013.01); *H04L 5/0048* (2013.01); *H04W 28/18* (2013.01)

(58) Field of Classification Search
CPC ..... H04W 28/18; H04W 48/18; H04W 48/20; H04L 5/0048
See application file for complete search history.

(56) References Cited

U.S. PATENT DOCUMENTS

| | | | | |
|---|---|---|---|---|
| 10,820,375 | B2 * | 10/2020 | Park | H04W 76/14 |
| 2015/0065049 | A1 | 3/2015 | Heo et al. | |
| 2022/0361264 | A1 | 11/2022 | Burns et al. | |
| 2023/0177221 | A1 * | 6/2023 | Scarpantoni | G06F 13/4282 |
| | | | | 726/17 |
| 2023/0180316 | A1 * | 6/2023 | Burns | H04W 52/281 |
| | | | | 370/252 |
| 2024/0380611 | A1 * | 11/2024 | Zhang | H04L 9/08 |

FOREIGN PATENT DOCUMENTS

CN            107172569  A   *  9/2017   ........ H04W 52/0245

OTHER PUBLICATIONS

Machine Translation of CN 107172569 A (Year: 2017).*
Cho, H., and Shin, K. "FLEW: Fully Emulated Wifi," Proceedings of the 28th Annual International Conference on Mobile Computing And Networking (MobiCom '22), Association for Computing Machinery.

* cited by examiner

*Primary Examiner* — Kevin M Cunningham
(74) *Attorney, Agent, or Firm* — Vivacqua Crane, PLLC

(57)                ABSTRACT

A system for managing wireless connections for a vehicle may include one or more wireless devices, a vehicle communication system, and a vehicle controller in electrical communication with the vehicle communication system. The vehicle controller is programmed to determine a selected device of the one or more wireless devices with which to establish a connection using the vehicle communication system. The vehicle controller is further programmed to establish a wireless connection between the selected device and the vehicle communication system in response to determining the selected device.

12 Claims, 3 Drawing Sheets

100

132a

132

SYSTEM AND METHOD FOR MANAGING WIRELESS CONNECTIONS FOR A VEHICLE

INTRODUCTION

The present disclosure relates to systems and methods for managing wireless connections for a vehicle.

To increase occupant awareness, comfort, and convenience, vehicles may be equipped with wireless communication systems capable of establishing connections with various wireless devices. Wireless devices may include, for example, a smartphone, a tablet, a laptop, a mouse, a keyboard, a remote control, a gaming controller, a wireless speaker, a wireless headphone, a wireless display, a wireless projector, a wireless camera, and/or the like. Wireless communication systems may utilize multiple communication protocols and techniques to establish connections, including, for example, BLUETOOTH, WiFi, and/or the like. However, current wireless communication systems may require users to manually configure, pair, and/or connect wireless devices. Additionally, when multiple wireless devices are present, current wireless communication systems may require users to select a preferred wireless device for connection.

Thus, while current wireless communication systems and methods achieve their intended purpose, there is a need for a new and improved system and method for managing wireless connections for a vehicle.

SUMMARY

According to several aspects, a system for managing wireless connections for a vehicle is provided. The system may include one or more wireless devices, a vehicle communication system, and a vehicle controller in electrical communication with the vehicle communication system. The vehicle controller is programmed to determine a selected device of the one or more wireless devices with which to establish a connection using the vehicle communication system. The vehicle controller is further programmed to establish a wireless connection between the selected device and the vehicle communication system in response to determining the selected device.

In another aspect of the present disclosure, to determine the selected device, the vehicle controller is further programmed to receive a plurality of signals using the vehicle communication system. The plurality of signals includes at least one signal from each of the one or more wireless devices. To determine the selected device, the vehicle controller is further programmed to determine a received signal strength indicator (RSSI) of each of the plurality of signals. To determine the selected device, the vehicle controller is further programmed to determine a connection intention for each of the one or more wireless devices based at least in part on the RSSI of each of the plurality of signals. The connection intention includes a connection establish intention and connection terminate intention. To determine the selected device, the vehicle controller is further programmed to determine a device preference for each of the one or more wireless devices. To determine the selected device, the vehicle controller is further programmed to determine the selected device based at least in part on the connection intention and the device preference.

In another aspect of the present disclosure, to determine the connection intention for a first of the one or more wireless devices, the vehicle controller is further programmed to compare the RSSI of each of the plurality of signals received from the first of the one or more wireless devices to a predetermined RSSI threshold. To determine the connection intention for a first of the one or more wireless devices, the vehicle controller is further programmed to determine an RSSI trend for each of the plurality of signals received from the first of the one or more wireless devices in response to determining that the RSSI of each of the plurality of signals received from the first of the one or more wireless devices is greater than or equal to the predetermined RSSI threshold. The RSSI trend includes at least one of: an RSSI increasing trend and an RSSI decreasing trend. To determine the connection intention for a first of the one or more wireless devices, the vehicle controller is further programmed to determine the connection intention for the first of the one or more wireless devices to be the connection establish intention in response to determining that the RSSI trend is the RSSI increasing trend. To determine the connection intention for a first of the one or more wireless devices, the vehicle controller is further programmed to determine the connection intention for the first of the one or more wireless devices to be the connection terminate intention in response to determining that the RSSI trend is the RSSI decreasing trend.

In another aspect of the present disclosure, to determine the RSSI trend, the vehicle controller is further programmed to remove noise from the RSSI of each of the plurality of signals received from the first of the one or more wireless devices using a measurement noise reduction algorithm. To determine the RSSI trend, the vehicle controller is further programmed to generate a fitted curve based on the RSSI of each of the plurality of signals received from the first of the one or more wireless devices. To determine the RSSI trend, the vehicle controller is further programmed to determine the RSSI trend based at least in part on the fitted curve.

In another aspect of the present disclosure, to determine the device preference for each of the one or more wireless devices, the vehicle controller is further programmed to record a plurality of device usage data for each of the one or more wireless devices. To determine the device preference for each of the one or more wireless devices, the vehicle controller is further programmed to determine the device preference for each of the one or more wireless devices based at least in part on the plurality of device usage data.

In another aspect of the present disclosure, to determine the selected device, the vehicle controller is further programmed to determine the selected device based at least in part on the connection intention and the device preference. The selected device is one of the one or more wireless devices having a highest device preference and having the connection establish intention.

In another aspect of the present disclosure, the vehicle controller is further programmed to transmit a standby message to a second of the one or more wireless devices in response to determining that the connection intention for the second of the one or more wireless devices is the connection terminate intention.

In another aspect of the present disclosure, to establish the wireless connection between the selected device and the vehicle communication system, the vehicle controller is further programmed to establish a first wireless connection between the selected device and the vehicle communication system using a first wireless communication protocol in response to determining the selected device. To establish the wireless connection between the selected device and the vehicle communication system, the vehicle controller is further programmed to identify an activation condition for the selected device. To establish the wireless connection between the selected device and the vehicle communication system, the vehicle controller is further programmed to establish a second wireless connection between the selected device and the vehicle communication system using a second wireless communication protocol in response to identifying the activation condition. At least one connection parameter of the second wireless connection is transmitted using the first wireless connection.

In another aspect of the present disclosure, the selected device includes a wireless camera. To identify the activation condition for the selected device, the vehicle controller is further programmed to receive a video streaming request. To identify the activation condition for the selected device, the vehicle controller is further programmed to identify the activation condition in response to receiving the video streaming request.

In another aspect of the present disclosure, the vehicle controller is further programmed to transmit at least one web real-time communication (WebRTC) video stream parameter to the selected device using the first wireless connection. The vehicle controller is further programmed to establish a WebRTC video stream from the selected device to the vehicle controller based at least in part on the at least one WebRTC video stream parameter. The WebRTC video stream is transmitted using the second wireless connection.

According to several aspects, a method for managing wireless connections for a vehicle is provided. The method may include receiving a plurality of signals from a wireless camera using a vehicle communication system. The method further may include determining a received signal strength indicator (RSSI) of each of the plurality of signals. The method further may include establishing a first wireless connection between the wireless camera and the vehicle communication system using a first wireless communication protocol based at least in part on the RSSI of each of the plurality of signals. The method further may include identifying an activation condition for the wireless camera. The method further may include establishing a second wireless connection between the wireless camera and the vehicle communication system using a second wireless communication protocol in response to identifying the activation condition, where at least one connection parameter of the second wireless connection is transmitted using the first wireless connection.

In another aspect of the present disclosure, establishing the first wireless connection between the wireless camera and the vehicle communication system further may include determining a connection intention for the wireless camera based at least in part on the RSSI of each of the plurality of signals. The connection intention includes a connection establish intention and connection terminate intention. Establishing the first wireless connection between the wireless camera and the vehicle communication system further may include establishing the first wireless connection between the wireless camera and the vehicle communication system using the first wireless communication protocol in response to determining that the connection intention is the connection establish intention.

In another aspect of the present disclosure, the method further may include transmitting a standby message to the wireless camera in response to determining that the connection intention for wireless camera is the connection terminate intention.

In another aspect of the present disclosure, determining the connection intention for the wireless camera based at least in part on the RSSI of each of the plurality of signals further may include comparing the RSSI of each of the plurality of signals received from the wireless camera to a predetermined RSSI threshold. Determining the connection intention for the wireless camera based at least in part on the RSSI of each of the plurality of signals further may include determining an RSSI trend for each of the plurality of signals received from the wireless camera in response to determining that the RSSI of each of the plurality of signals received from the wireless camera is greater than or equal to the predetermined RSSI threshold. The RSSI trend includes at least one of: an RSSI increasing trend and an RSSI decreasing trend. Determining the connection intention for the wireless camera based at least in part on the RSSI of each of the plurality of signals further may include determining the connection intention for the wireless camera to be the connection establish intention in response to determining that the RSSI trend is the RSSI increasing trend. Determining the connection intention for the wireless camera based at least in part on the RSSI of each of the plurality of signals further may include determining the connection intention for the wireless camera to be the connection terminate intention in response to determining that the RSSI trend is the RSSI decreasing trend.

In another aspect of the present disclosure, identifying the activation condition for the wireless camera further may include receiving a video streaming request and identifying the activation condition in response to receiving the video streaming request.

In another aspect of the present disclosure, the method further may include activating a child-left-behind detection feature of the wireless camera in response to determining that the RSSI of each of the plurality of signals received from the wireless camera is greater than or equal to a predetermined RSSI threshold. The method further may include providing a warning notification in response to determining that the RSSI of each of the plurality of signals received from the wireless camera is less than the predetermined RSSI threshold.

In another aspect of the present disclosure, the method further may include determining a first distance between a key fob and the vehicle. The method further may include determining a second distance between the wireless camera and the vehicle based at least in part on the RSSI of each of the plurality of signals received from the wireless camera. The method further may include calculating a difference between the first distance and the second distance. The method further may include providing a warning notification in response to determining that the difference is greater than or equal to a predetermined difference threshold.

According to several aspects, a system for managing wireless connections for a vehicle is provided. The system may include a wireless camera, a vehicle communication system configured for wireless communication with the wireless camera, a vehicle display, and a vehicle controller in electrical communication with the vehicle communication system and the vehicle display. The vehicle controller is programmed to receive a plurality of signals from a wireless camera using a vehicle communication system. The vehicle controller is further programmed to determine a received signal strength indicator (RSSI) of each of the plurality of signals. The vehicle controller is further programmed to establish a first wireless connection between the wireless camera and the vehicle communication system using a wireless personal area network (PAN) communication protocol based at least in part on the RSSI of each of the plurality of signals. The vehicle controller is further programmed to identify an activation condition for the wireless camera in response to receiving a video streaming request. The vehicle controller is further programmed to establish a second wireless connection between the wireless camera and the vehicle communication system using a wireless local area network (LAN) communication protocol in response to identifying the activation condition, where at least one connection parameter of the second wireless connection is transmitted using the first wireless connection. The vehicle controller is further programmed to receive a video stream from the wireless camera using the vehicle communication system. The vehicle controller is further programmed to display the video stream using the vehicle display.

In another aspect of the present disclosure, to establish the first wireless connection between the wireless camera and the vehicle communication system, the vehicle controller is further programmed to compare the RSSI of each of the plurality of signals received from the wireless camera to a predetermined RSSI threshold. To establish the first wireless connection between the wireless camera and the vehicle communication system, the vehicle controller is further programmed to determine an RSSI trend for each of the plurality of signals received from the wireless camera in response to determining that the RSSI of each of the plurality of signals received from the wireless camera is greater than or equal to the predetermined RSSI threshold. The RSSI trend includes at least one of: an RSSI increasing trend and an RSSI decreasing trend. To establish the first wireless connection between the wireless camera and the vehicle communication system, the vehicle controller is further programmed to determine a connection intention for the wireless camera to be a connection establish intention in response to determining that the RSSI trend is the RSSI increasing trend. To establish the first wireless connection between the wireless camera and the vehicle communication system, the vehicle controller is further programmed to determine a connection intention for the wireless camera to be a connection terminate intention in response to determining that the RSSI trend is the RSSI decreasing trend. To establish the first wireless connection between the wireless camera and the vehicle communication system, the vehicle controller is further programmed to establish the first wireless connection between the wireless camera and the vehicle communication system using the wireless PAN communication protocol in response to determining that the connection intention is the connection establish intention. To establish the first wireless connection between the wireless camera and the vehicle communication system, the vehicle controller is further programmed to transmit a standby message to the wireless camera in response to determining that the connection intention for wireless camera is the connection terminate intention.

In another aspect of the present disclosure, to establish the second wireless connection between the wireless camera and the vehicle communication system, the vehicle controller is further programmed to transmit at least one connection parameter for the second wireless connection to the wireless camera with the vehicle communication system using the first wireless connection. The at least one connection parameter includes at least one of: a service set identifier (SSID), a network security type, and a network security key.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

6

Figure 1:
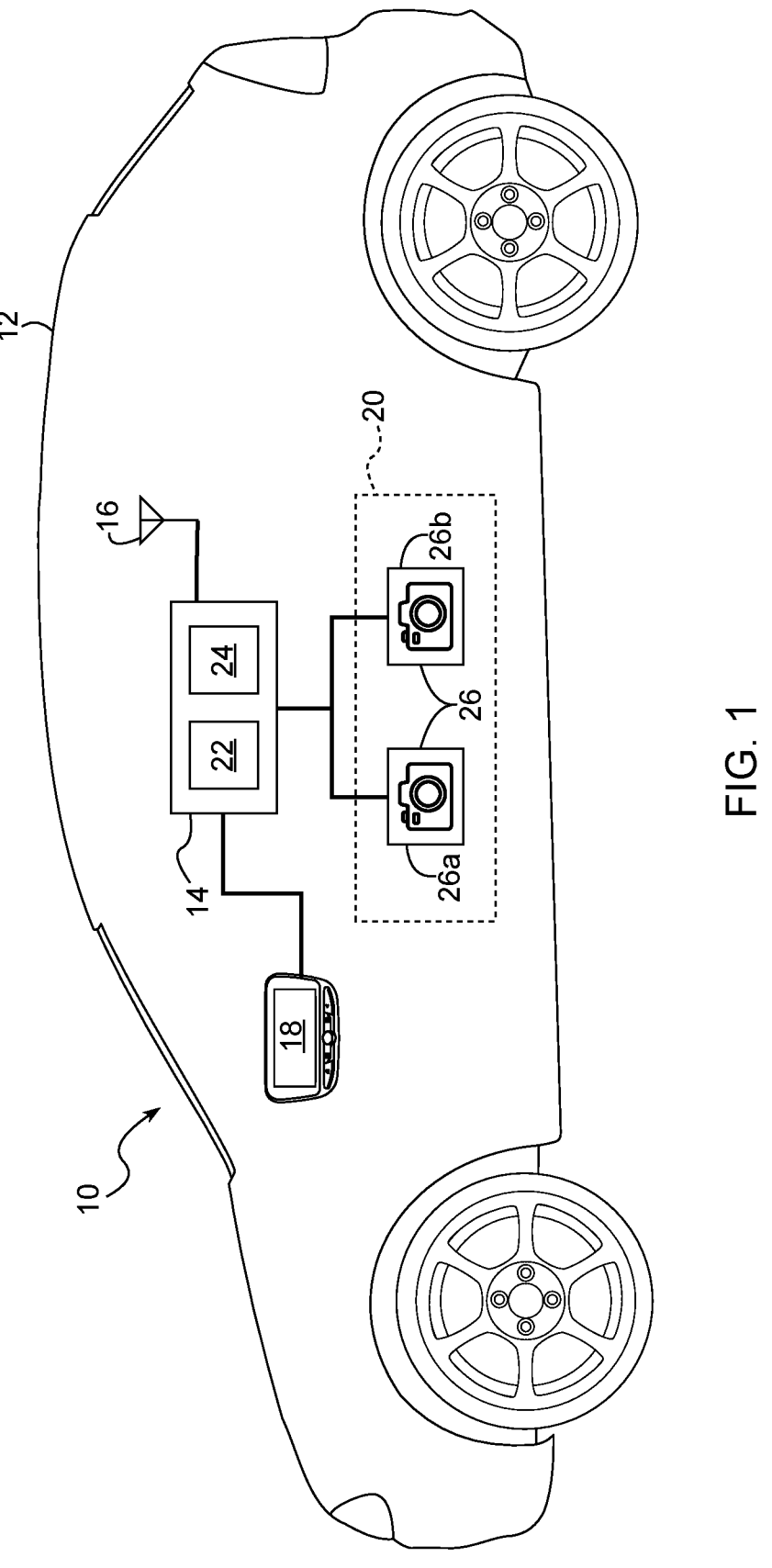
Figure 2:
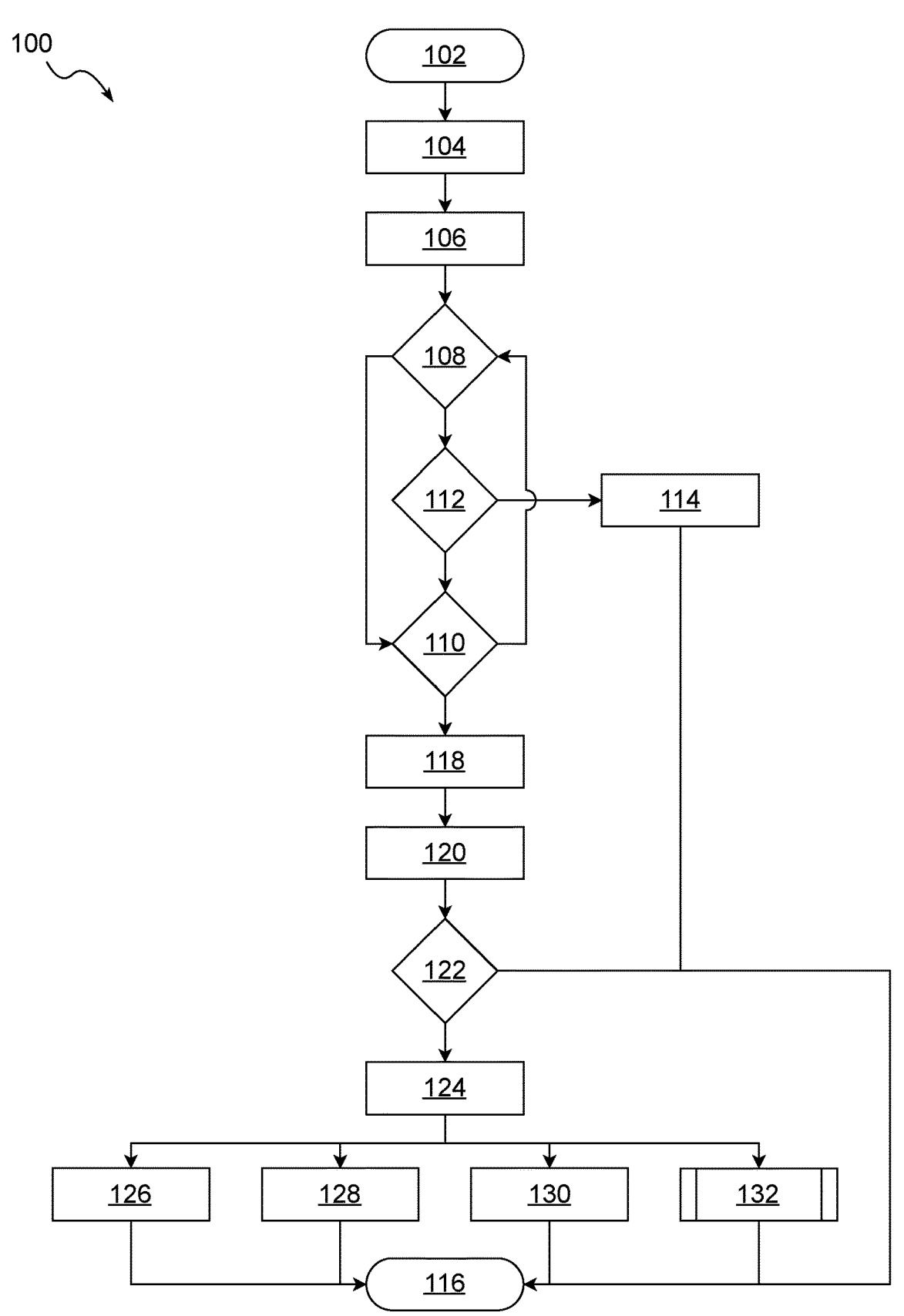
Figure 3:
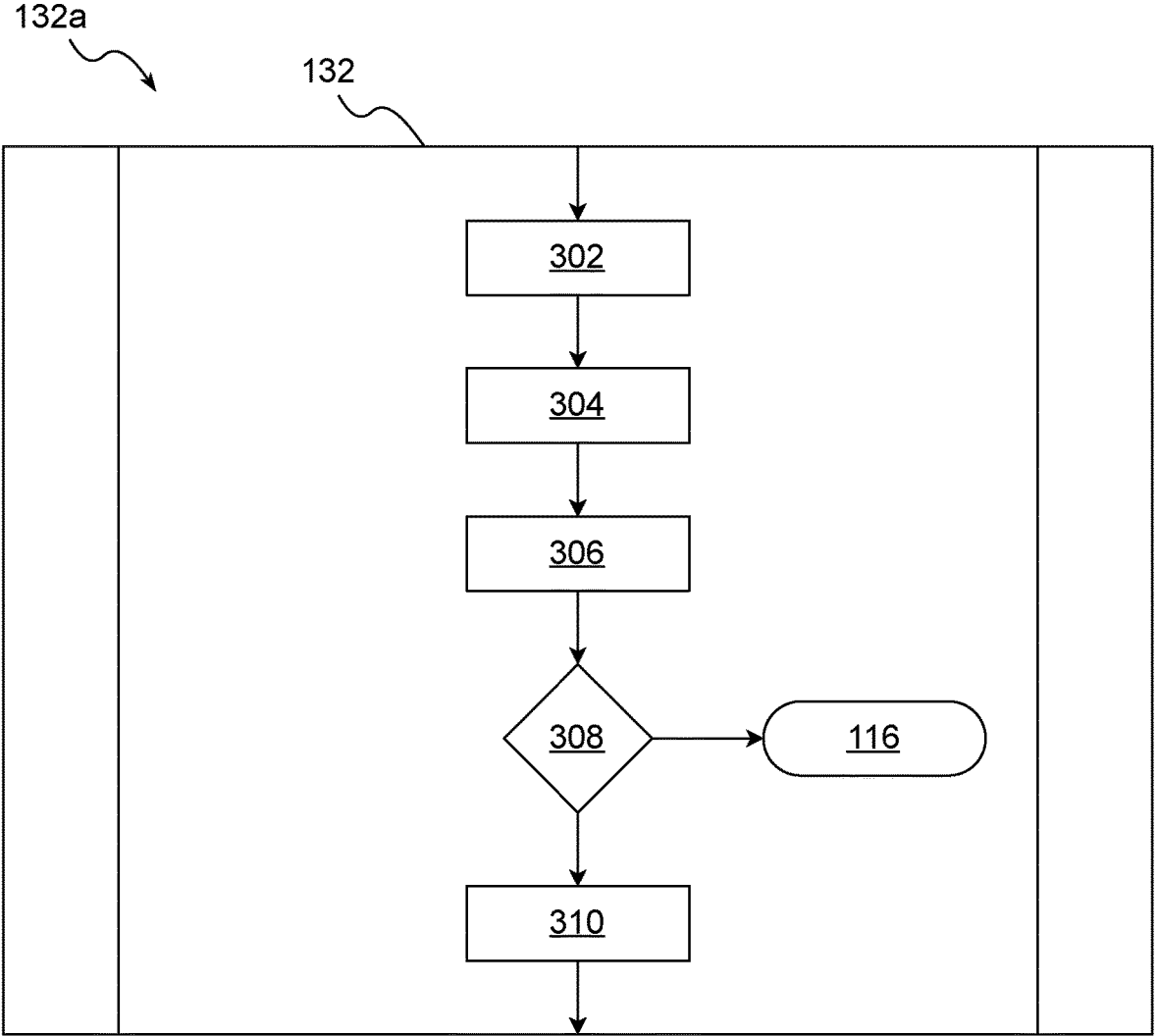

FIG. 1 is a schematic diagram of a system for managing wireless connections for a vehicle, according to an exemplary embodiment;

FIG. 2 is a flowchart of a method for managing wireless connections for a vehicle, according to an exemplary embodiment; and FIG. 3 is a flowchart of a method for identifying a device left behind condition, according to an exemplary embodiment.

DETAILED DESCRIPTION

The following description is merely exemplary in nature and is not intended to limit the present disclosure, application, or uses.

Users and/or occupants of vehicles may desire to connect wireless devices to vehicle systems for the purpose of providing entertainment, gathering data, increasing comfort and convenience, and/or the like. However, steps required to pair and connect devices may impact user experience. Therefore, the present disclosure provides a new and improved system and method for managing wireless connections for a vehicle, including utilizing multiple wireless connections to streamline the connection process.

Referring to FIG. 1, a system for managing wireless connections for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a vehicle communication system 16, a vehicle display 18, and one or more wireless devices 20.

The vehicle controller 14 is used to implement a method 100 for managing wireless connections for a vehicle, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 24 may include volatile and non-volatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple vehicle controllers which are in electrical communication with each other. The vehicle controller 14 may be inter-connected with additional systems and/or vehicle controllers of the vehicle 12, allowing the vehicle controller 14 to access data such as, for example, speed, acceleration, braking, and steering angle of the vehicle 12.

The vehicle controller 14 is in electrical communication with the vehicle communication system 16, the vehicle display 18, and the one or more wireless devices 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The vehicle communication system 16 is used by the vehicle controller 14 to communicate with other systems external to the vehicle 12. For example, the vehicle communication system 16 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 16 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 16 may further include an embedded universal integrated circuit card (eUICC) configured to store at least one cellular connectivity configuration profile, for example, an embedded subscriber identity module (eSIM) profile. The vehicle communication system 16 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 16 may include one or more antennas and/or communication transceivers for receiving and/or transmitting signals, such as cooperative sensing messages (CSMs). The vehicle communication system 16 is configured to wirelessly communicate information between the vehicle 12 and another vehicle. Further, the vehicle communication system 16 is configured to wirelessly communicate information between the vehicle 12 and infrastructure or other vehicles. It should be understood that the vehicle communication system 16 may be integrated with the vehicle controller 14 (e.g., on a same circuit board with the vehicle controller 14 or otherwise a part of the vehicle controller 14) without departing from the scope of the present disclosure.

The vehicle display 18 is used to provide information to an occupant of the vehicle 12. In the scope of the present disclosure, the occupant includes a driver and/or a passenger of the vehicle 12. In the exemplary embodiment depicted in FIG. 1, the vehicle display 18 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the vehicle display 18 is disposed in a rearview mirror are also within the scope of the present disclosure. In another exemplary embodiment, the vehicle display 18 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the vehicle display 18 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the vehicle display 18 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure.

The one or more wireless devices 20 are used to provide additional functionality or features to the system 10. In the scope of the present disclosure, the one or more wireless devices 20 includes any electronic device operable to establish a connection with the vehicle communication system 16 using any wireless communication protocol, such as, for example, a wireless local area network (WLAN), a personal area network (e.g., BLUETOOTH, BLUETOOTH LOW ENERGY, and/or the like), near-field communication (NFC), and/or any additional type of radiofrequency communication.

In an exemplary embodiment, the one or more wireless devices 20 includes one or more personal computing devices, such as, for example, a smartphone, a tablet, a laptop, and/or the like. In another exemplary embodiment, the one or more wireless devices 20 includes one or more wireless input devices, such as, for example, a mouse, a keyboard, a remote control, a gaming controller, and/or the like. In another exemplary embodiment, the one or more wireless devices 20 includes one or more wireless output devices, such as, for example, a wireless speaker, a wireless headphone, a wireless display, a wireless projector, and/or the like. In the exemplary embodiment depicted in FIG. 1 and described hereinafter, the one or more wireless devices 20 includes one or more wireless cameras 26 (e.g., a first wireless camera 26a and a second wireless camera 26b).

The one or more wireless cameras 26 are used to provide picture and/or video monitoring, recording, and/or streaming capability. In an exemplary embodiment, each of the one or more wireless cameras 26 includes a camera controller, a camera optics system, and a camera communication system. The camera controller includes at least one processor and a non-transitory computer readable storage media. The camera controller is configured to capture picture and/or video using the camera optics system and transmit picture and/or video using the camera communication system.

The camera optics system includes a camera sensor and one or more optical elements (e.g., lenses, mirrors, prisms, and/or the like). The camera optics system is controlled by the camera controller to capture picture and/or video. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The camera communication system is configured to wirelessly communicate with the vehicle communication system 16 using multiple wireless protocols. In a non-limiting example, the camera communication system is configured to communicate with the vehicle communication system 16 using a first wireless communication protocol, for example, a wireless personal area network (PAN) communication protocol (e.g., BLUETOOTH LOW ENERGY). The camera communication system is further configured to communicate with the vehicle communication system 16 using a second wireless communication protocol, for example, a wireless local area network (LAN) communication protocol (e.g., according to IEEE 802.11 standards). In an exemplary embodiment, one of the wireless communication protocols is used primarily for transmission and/or streaming of picture and/or video, while the other wireless communication protocol is used for out-of-band transmission of connection parameters, connection credentials, diagnostic information, and/or the like. In another exemplary embodiment, both the first wireless communication protocol and the second wireless communication protocol may be used for transmission and/or streaming of picture and/or video. Communication between the one or more wireless cameras 26 and the vehicle communication system 16 using the first wireless communication protocol and the second wireless communication protocol will be discussed in greater detail below.

Referring to FIG. 2, a flowchart of the method 100 for managing wireless connections for a vehicle is shown. The method 100 begins at block 102 and proceeds to block 104. At block 104, the vehicle controller 14 receives a plurality of signals using the vehicle communication system 16. The plurality of signals includes at least one signal from the each of the one or more wireless devices 20.

In an exemplary embodiment wherein the one or more wireless devices 20 includes only one device, each of the plurality of signals is received from the one device. In another exemplary embodiment wherein the one or more wireless devices 20 includes multiple devices (e.g., the first wireless camera 26a and the second wireless camera 26b), the plurality of signals is separated into a plurality of subsets based on the transmitting device. Each of the plurality of subsets includes only signals from one of the one or more wireless devices 20. For example, a first subset of the plurality of signals includes the signals received from the first wireless camera 26a and a second subset of the plurality of signals includes the signals received from the second wireless camera 26b.

In a non-limiting example, the plurality of signals are BLUETOOTH advertising packets (i.e., packets sent by a device which is ready to establish a BLUETOOTH connection). In an exemplary embodiment, the BLUETOOTH advertising packets include information such as, for example, a device name, a device transmit power, unique identifiers (UIDs) of services supported by the device, and/or the like. After block 104, the method 100 proceeds to block 106.

At block 106, the vehicle controller 14 determines the received signal strength indicator (RSSI) of each of the plurality of signals received at block 104. In the scope of the present disclosure, the RSSI is a measurement of power present in a received radio signal. After block 106, the method 100 proceeds to block 108.

At block 108, the vehicle controller 14 compares the RSSI of the first subset to a predetermined RSSI threshold (e.g., −80 dBm). In an exemplary embodiment, the RSSI of the first subset is an average of all RSSI values in the first subset (i.e., for the subset of the plurality of signals received from the first wireless camera 26a). In another exemplary embodiment, the RSSI of the first subset is a minimum of all RSSIs in the first subset. If the RSSI of the first subset is less than the predetermined RSSI threshold, the method 100 proceeds to block 110, as will be discussed in greater detail below. If the RSSI of the first subset is greater than or equal to the predetermined RSSI threshold, the method 100 proceeds to block 112.

At block 112, the vehicle controller 14 determines a connection intention for the one or more wireless devices 20. In the scope of the present disclosure, the connection intention describes a predicted intention of a user or occupant of the vehicle 12 regarding the one or more wireless devices 20. If the user is predicted to intend to establish a connection between the vehicle 12 and the one or more wireless devices 20, the connection intention is a connection establish intention. If the user is predicted to intend to disconnect and/or remove the one or more wireless devices 20, the connection intention is a connection terminate intention.

In an exemplary embodiment, the connection intention for the first wireless camera 26a is determined based on an RSSI trend for the first subset (i.e., for the subset of the plurality of signals received from the first wireless camera 26a). In the scope of the present disclosure, the RSSI trend is a pattern or direction in which the RSSI values in the first subset are changing over time. In an exemplary embodiment, the RSSI trend includes at least one of: an RSSI increasing trend and an RSSI decreasing trend. The RSSI increasing trend describes RSSI values which tend to increase over time, implying that the device transmitting the signals (e.g., the first wireless camera 26a) is getting nearer to the device receiving the signals (i.e., the vehicle communication system 16). It should be understood that the RSSI increasing trend may include linear trends, exponential trends, logarithmic trends, and/or the like without departing from the scope of the present disclosure.

The RSSI decreasing trend describes RSSI values which tend to decrease over time, implying that the device transmitting the signals (e.g., the first wireless camera 26a) is getting farther from the device receiving the signals (i.e., the vehicle communication system 16). It should be understood that the RSSI decreasing trend may include linear trends, exponential trends, logarithmic trends, and/or the like without departing from the scope of the present disclosure.

In an exemplary embodiment, the RSSI trend is determined by generating a fitted curve based at least in part on the RSSI values. In a non-limiting example, the vehicle controller 14 first pre-processes the RSSI values to remove noise using a measurement noise reduction algorithm. In the scope of the present disclosure, the measurement noise reduction algorithm is an algorithm configured to reduce noise in measurements, including, for example, a Kalman filter, a moving average, and/or the like.

After pre-processing the RSSI values, the fitted curve is generated using a curve fitting algorithm, for example, a linear regression, a polynomial regression, and/or the like. The fitted curve is then analyzed to determine whether it is an increasing function or a decreasing function. If the fitted curve is an increasing function, the RSSI trend is determined to be the RSSI increasing trend. If the fitted curve is a decreasing function, the RSSI trend is determined to be the RSSI decreasing trend.

If the RSSI trend for the first subset is the RSSI increasing trend, the connection intention of the first wireless camera 26a is determined to be the connection establish intention, and the method 100 proceeds to block 110 as will be discussed in greater detail below. If the RSSI trend for the first subset is the RSSI decreasing trend, the connection intention of the first wireless camera 26a is determined to be the connection terminate intention, and the method 100 proceeds to block 114.

At block 114, the vehicle controller 14 uses the vehicle communication system 16 to transmit a standby message to the first wireless camera 26a. In the scope of the present disclosure, the standby message prompts the first wireless camera 26a to enter a standby, power saving, or shutdown mode. After block 114, the method 100 proceeds to enter a standby state at block 116.

At block 110, if the connection intention for each of the one or more wireless devices 20 has not yet been determined, the method 100 returns to block 108 to compare the RSSI of another subset of the plurality of subsets (e.g., the second subset) to the predetermined RSSI threshold. If the connection intention for each of the one or more wireless devices 20 has been determined, the method 100 proceeds to block 118.

At block 118, the vehicle controller 14 determines a device preference for each of the one or more wireless devices 20. In the scope of the present disclosure, the device preference quantifies a preference of the user or occupant for connecting each of the one or more wireless devices 20. In an exemplary embodiment, the device preference is represented with an ordered ranking of the one or more wireless devices 20. For example, the first wireless camera 26a may have a higher device preference than the second wireless camera 26b.

In another exemplary embodiment, the device preference is represented as a mathematical graph data structure. The mathematical graph data structure includes a plurality of vertices and a plurality of directional weighted edges. Each of the plurality of vertices represents one of the one or more wireless devices 20. Each of the plurality of directional weighted edges originates from a first one of the plurality of vertices with terminates at a second one of the plurality of vertices. Therefore, by traversing the mathematical graph structure according to the plurality of directional weighted edges, one may determine a preferred device. In a non-limiting example, the weight of each of the directional weighted edges is determined based on a plurality of device usage data for each of the one or more wireless devices 20. For example, if the user disconnects the first wireless camera 26a and connects the second wireless camera 26b, the weight of one of the plurality of vertices originating from the second wireless camera 26b and terminating at the first wireless camera 26a is increased relative to the weight of one of the plurality of vertices originating from the first wireless camera 26a and terminating at the second wireless camera 26b.

It should be understood that the ordered ranking and/or the mathematical graph data structure may be stored in the media 24 and/or in a remote server system without departing from the scope of the present disclosure. It should further be understood that any method for quantifying and storing the device preference for the one or more wireless devices 20, including, for example, deterministic methods, machine learning methods, and/or the like, are within the scope of the present disclosure. After block 118, the method 100 proceeds to block 120.

At block 120, the vehicle controller 14 uses the vehicle communication system 16 to establish a first wireless connection between one of the one or more wireless devices 20 and the vehicle communication system 16. In an exemplary embodiment, the vehicle controller 14 determines a selected device of the one or more wireless devices 20 based at least in part on the connection intention of each of the one or more wireless devices 20 determined at block 112 and the device preference of each of the one or more wireless devices 20 determined at block 118. In a non-limiting example, the selected device is one of the one or more wireless devices 20 having a highest device preference and having the connection establish intention. For example, the vehicle controller 14 may traverse the mathematical graph data structure based on the weight of each of the directional weighted edges to determine the one of the one or more wireless devices 20 having the highest device preference.

In an exemplary embodiment, the first wireless connection is established using the first wireless communication protocol (e.g., the wireless PAN). Therefore, at block 120, the vehicle controller 14 uses the vehicle communication system 16 to establish the first wireless connection (e.g., a BLUETOOTH LOW ENERGY connection) between the selected device and the vehicle communication system 16. After block 120, the method 100 proceeds to block 122.

At block 122, the vehicle controller 14 identifies an activation condition for the selected device. In the scope of the present disclosure, the activation condition is a scenario which triggers activation of the selected device. In a non-limiting example, if the selected device is one of the one or more wireless cameras 26, the activation condition includes a video streaming request. In the scope of the present disclosure, a video streaming request is a request to record and/or stream video within the vehicle 12 (e.g., to the vehicle display 18) and/or outside of the vehicle 12 (e.g., to a remote server and/or to a mobile device). In another non-limiting example, the activation condition includes a security disturbance, for example, contact of a foreign object with an exterior of the vehicle 12. If the activation condition is not identified, the method 100 proceeds to enter the standby state at block 116. If the activation condition is identified, the method 100 proceeds to block 124.

At block 124, the vehicle controller 14 uses the vehicle communication system 16 to establish a second wireless connection between the selected device and the vehicle communication system 16. In an exemplary embodiment, the second wireless connection is established using the second wireless communication protocol (e.g., the wireless LAN). Therefore, at block 124, the vehicle controller 14 uses the vehicle communication system 16 to establish the second wireless connection (e.g., a WiFi connection according to IEEE 802.11 standards) between the selected device and the vehicle communication system 16. In an exemplary embodiment, to establish the second wireless connection, at least one connection parameter is transmitted to the selected device using the first wireless connection established at block 120. In the scope of the present disclosure, a connection parameter is information necessary for establishing the second wireless connection. In a non-limiting example, the at least one connection parameter includes at least one of: a service set identifier (SSID), a network security type, and a network security key of the wireless LAN network. After block 124, the method 100 proceeds to blocks 126, 128, 130, and 132.

At block 126, the selected device (i.e., one of the wireless cameras 26) transmits a video stream to the vehicle communication system 16. In an exemplary embodiment, the vehicle controller 14 uses the vehicle display 18 to display the video stream to occupants of the vehicle 12. In another exemplary embodiment, the vehicle controller 14 saves the video steam in the media 24 for later use. After block 126, the method 100 proceeds to enter the standby state at block 116.

At block 128, the vehicle controller 14 uses the selected device (i.e., one of the wireless cameras 26) to activate a child-left-behind detection feature. In the scope of the present disclosure, the child-left-behind detection feature allows for detection and notification of a child left in the vehicle 12. In a non-limiting example, the child-left-behind detection feature is activated in response to determining that the RSSI of each of the plurality of signals received from the selected device is greater than or equal to the predetermined RSSI threshold. In another non-limiting example, a video streaming quality of the selected device is adjusted based at least in part on the RSSI of each of the plurality of signals received from the selected device. After block 128, the method 100 proceeds to enter the standby state at block 116.

At block 130, the vehicle controller 14 measures the RSSI of the first wireless connection between the vehicle communication system 16 and the selected device established at block 120. If the RSSI of the first wireless connection is less than the predetermined RSSI threshold, the vehicle controller 14 provides a warning notification using the vehicle display 18. In a non-limiting example, the warning notification indicates that the selected device is approaching a maximum wireless range, and that connection quality may be degraded. After block 130, the method 100 proceeds to enter the standby state at block 116.

At block 132, the vehicle controller 14 identifies a device left behind condition, as will be discussed in greater detail below. After block 132, the method 100 proceeds to enter the standby state at block 116.

Referring to FIG. 3, a flowchart of an exemplary embodiment 132a of block 132 is shown. The exemplary embodiment 132a begins at block 302. At block 302, the vehicle controller 14 determines a first distance between a key fob and the vehicle 12. In the scope of the present disclosure, the key fob is a device in possession of an owner and/or operator of the vehicle 12. The key fob includes a key fob communication system, one or more key fob buttons, and a key fob controller in electrical communication with the key fob communication system and the one or more key fob buttons. Upon activation of the one or more key fob buttons, the key fob controller sends a wireless transmission using the key fob communication system. In a non-limiting example, the vehicle communication system 16 is configured to receive the wireless transmission. The vehicle controller 14 is configured to take action based on the wireless transmission, for example, unlocking one or more doors of the vehicle 12, opening a trunk of the vehicle 12, activating a horn of the vehicle 12, and/or the like.

In an exemplary embodiment, to determine the first distance between the key fob and the vehicle 12, the vehicle controller 14 uses the vehicle communication system 16. In a non-limiting example, the vehicle communication system 16 determines the first distance between the key fob and the vehicle 12 using received signal strength indicator (RSSI) based ranging. By correlating the RSSI with one or more known signal propagation characteristics (e.g., the inverse square law), the vehicle communication system 16 determines a distance between the key fob and the vehicle 12. In another non-limiting example, the vehicle communication system 16 uses ultra-wideband (UWB) based ranging to determine the distance between the key fob and the vehicle 12 (e.g., according to IEEE 802.15.4). In another non-limiting example, the vehicle communication system 16 uses personal area network communication (e.g., BLUETOOTH) to determine the distance between the key fob and the vehicle 12. It should be understood that any method for determining the distance between the key fob and the vehicle 12 is within the scope of the present disclosure. After block 302, the exemplary embodiment 132a proceeds to block 304.

At block 304, the vehicle controller 14 determines a second distance between the vehicle 12 and the selected device (i.e., one of the one or more wireless cameras 26) based at least in part on the RSSI of each of the plurality of signals received from the selected device (e.g., using RSSI based ranging, as discussed above). After block 304, the exemplary embodiment 132a proceeds to block 306.

At block 306, the vehicle controller 14 calculates a difference between the first distance determined at block 302 and the second distance determined at block 304. After block 306, the exemplary embodiment 132a proceeds to block 308.

At block 308, the vehicle controller 14 compares the difference calculated at block 306 to a predetermined difference threshold (e.g., ten percent). If the difference calculated at block 306 is less than the predetermined difference threshold, the exemplary embodiment 132a is concluded, and the method 100 enters the standby state at block 116. If the difference calculated at block 306 is greater than or equal to the predetermined difference threshold, the exemplary embodiment 132a proceeds to block 310.

At block 310, the vehicle controller 14 provides a warning notification to the occupant of the vehicle 12 using the vehicle display 18. In a non-limiting example, the warning notification indicates that the selected device has been left behind in the vehicle 12. After block 310, the exemplary embodiment 132a is concluded, and the method 100 proceeds as described above.

The system 10 and method 100 of the present disclosure offer several advantages. Based on the RSSI of the plurality of signals, the system 10 and method 100 determine the connection intention at an early stage, allowing for quick and seamless pairing and connection with devices. Additionally, the system 10 and method 100 may be leveraged to provide context information based on the location and status of the one or more wireless devices 20. Furthermore, the system 10 and method 100 may be used to provide fallback video streaming capabilities using the first wireless connection in the event of a fault with the second wireless connection. Furthermore, in the event of a fault condition with the second wireless connection, the first wireless connection may be used to establish communication with the one or more wireless devices 20 and perform diagnosis of the fault condition.

Additionally, the system 10 and method 100 may be used to provide out-of-band communication capabilities for streaming services, such as, for example WebRTC streaming. Rather than relying on a middle-man server to transfer session information between the one or more wireless devices 20 and the vehicle communication system 16, the first wireless connection can be used to transfer and negotiate WebRTC video stream parameters. In an exemplary embodiment, to establish a WebRTC stream, the WebRTC video stream parameters must be negotiated between the vehicle communication system 16 and the one or more wireless devices 20. In a non-limiting example, the WebRTC video stream parameters include, for example, session description protocol (SDP) information (e.g., metadata describing resolution, formats, codecs, encryption and/or the like), network information, offer and answer message exchanges, error handling protocols/mechanisms, and/or the like. In an exemplary embodiment, the first wireless connection can be used to transfer and negotiate WebRTC video stream parameters for establishment of the WebRTC video stream using the second wireless connection.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for managing wireless connections for a vehicle, the system comprising:
   one or more wireless devices;
   a vehicle communication system; and
   a vehicle controller in electrical communication with the vehicle communication system, wherein the vehicle controller is programmed to:
      determine a selected device of the one or more wireless devices with which to establish a connection using the vehicle communication system, wherein to determine the selected device, the vehicle controller is further programmed to:
         receive a plurality of signals using the vehicle communication system, wherein the plurality of signals includes at least one signal from each of the one or more wireless devices;
         determine a received signal strength indicator (RSSI) of each of the plurality of signals;
         determine a connection intention for each of the one or more wireless devices based at least in part on the RSSI of each of the plurality of signals, wherein the connection intention includes: a connection establish intention and connection terminate intention, wherein to determine the connection intention for a first of the one or more wireless devices, the vehicle controller is further programmed to:
            compare the RSSI of each of the plurality of signals received from the first of the one or more wireless devices to a predetermined RSSI threshold;
            determine an RSSI trend for each of the plurality of signals received from the first of the one or more wireless devices in response to determining that the RSSI of each of the plurality of signals received from the first of the one or more wireless devices is greater than or equal to the predetermined RSSI threshold, wherein the RSSI trend includes at least one of: an RSSI increasing trend and an RSSI decreasing trend, wherein to determine the RSSI trend, the vehicle controller is further programmed to:
               remove noise from the RSSI of each of the plurality of signals received from the first of the one or more wireless devices using a measurement noise reduction algorithm;
               generate a fitted curve based on the RSSI of each of the plurality of signals received from the first of the one or more wireless devices; and
               determine the RSSI trend based at least in part on the fitted curve;
            determine the connection intention for the first of the one or more wireless devices to be the connection establish intention in response to determining that the RSSI trend is the RSSI increasing trend; and
            determine the connection intention for the first of the one or more wireless devices to be the connection terminate intention in response to determining that the RSSI trend is the RSSI decreasing trend;
         determine a device preference for each of the one or more wireless devices; and
         determine the selected device based at least in part on the connection intention and the device preference; and
      establish a wireless connection between the selected device and the vehicle communication system in response to determining the selected device.

2. The system of claim 1, wherein to determine the device preference for each of the one or more wireless devices, the vehicle controller is further programmed to:
   record a plurality of device usage data for each of the one or more wireless devices; and
   determine the device preference for each of the one or more wireless devices based at least in part on the plurality of device usage data.

3. The system of claim 1, wherein to determine the selected device, the vehicle controller is further programmed to:
   determine the selected device based at least in part on the connection intention and the device preference, wherein the selected device is one of the one or more wireless devices having a highest device preference and having the connection establish intention.

4. The system of claim 1, wherein the vehicle controller is further programmed to:
   transmit a standby message to a second of the one or more wireless devices in response to determining that the connection intention for the second of the one or more wireless devices is the connection terminate intention.

5. The system of claim 1, wherein to establish the wireless connection between the selected device and the vehicle communication system, the vehicle controller is further programmed to:
   establish a first wireless connection between the selected device and the vehicle communication system using a first wireless communication protocol in response to determining the selected device;
   identify an activation condition for the selected device; and
   establish a second wireless connection between the selected device and the vehicle communication system using a second wireless communication protocol in response to identifying the activation condition, wherein at least one connection parameter of the second wireless connection is transmitted using the first wireless connection.

6. The system of claim 5, wherein the selected device includes a wireless camera, and wherein to identify the activation condition for the selected device, the vehicle controller is further programmed to:

receive a video streaming request; and identify the activation condition in response to receiving the video streaming request.

7. The system of claim 6, wherein the vehicle controller is further programmed to:

transmit at least one web real-time communication (WebRTC) video stream parameter to the selected device using the first wireless connection; and establish a WebRTC video stream from the selected device to the vehicle controller based at least in part on the at least one WebRTC video stream parameter, wherein the WebRTC video stream is transmitted using the second wireless connection.

8. A method for managing wireless connections for a vehicle, the method comprising:

receiving a plurality of signals from a wireless camera using a vehicle communication system;

determining a received signal strength indicator (RSSI) of each of the plurality of signals;

establishing a first wireless connection between the wireless camera and the vehicle communication system using a first wireless communication protocol based at least in part on the RSSI of each of the plurality of signals, wherein establishing the first wireless connection between the wireless camera and the vehicle communication system further comprises:

determining a connection intention for the wireless camera based at least in part on the RSSI of each of the plurality of signals, wherein the connection intention includes: a connection establish intention and connection terminate intention, and wherein determining the connection intention for the wireless camera based at least in part on the RSSI of each of the plurality of signals further comprises:

comparing the RSSI of each of the plurality of signals received from the wireless camera to a predetermined RSSI threshold;

determining an RSSI trend for each of the plurality of signals received from the wireless camera in response to determining that the RSSI of each of the plurality of signals received from the wireless camera is greater than or equal to the predetermined RSSI threshold, wherein the RSSI trend includes at least one of: an RSSI increasing trend and an RSSI decreasing trend;

determining the connection intention for the wireless camera to be the connection establish intention in response to determining that the RSSI trend is the RSSI increasing trend; and determining the connection intention for the wireless camera to be the connection terminate intention in response to determining that the RSSI trend is the RSSI decreasing trend; and establishing the first wireless connection between the wireless camera and the vehicle communication system using the first wireless communication protocol in response to determining that the connection intention is the connection establish intention;

identifying an activation condition for the wireless camera;

establishing a second wireless connection between the wireless camera and the vehicle communication system using a second wireless communication protocol in response to identifying the activation condition, wherein at least one connection parameter of the second wireless connection is transmitted using the first wireless connection;

activating a child-left-behind detection feature of the wireless camera in response to determining that the RSSI of each of the plurality of signals received from the wireless camera is greater than or equal to a predetermined RSSI threshold; and providing a warning notification in response to determining that the RSSI of each of the plurality of signals received from the wireless camera is less than the predetermined RSSI threshold.

9. The method of claim 8, further comprising:

transmitting a standby message to the wireless camera in response to determining that the connection intention for wireless camera is the connection terminate intention.

10. The method of claim 8, wherein identifying the activation condition for the wireless camera further comprises:

receiving a video streaming request; and identifying the activation condition in response to receiving the video streaming request.

11. The method of claim 8, further comprising:

determining a first distance between a key fob and the vehicle;

determining a second distance between the wireless camera and the vehicle based at least in part on the RSSI of each of the plurality of signals received from the wireless camera;

calculating a difference between the first distance and the second distance; and providing a warning notification in response to determining that the difference is greater than or equal to a predetermined difference threshold.

12. A system for managing wireless connections for a vehicle, the system comprising:

a wireless camera;

a vehicle communication system configured for wireless communication with the wireless camera;

a vehicle display;

a vehicle controller in electrical communication with the vehicle communication system and the vehicle display, wherein the vehicle controller is programmed to:

receive a plurality of signals from a wireless camera using a vehicle communication system;

determine a received signal strength indicator (RSSI) of each of the plurality of signals;

establish a first wireless connection between the wireless camera and the vehicle communication system using a wireless personal area network (PAN) communication protocol based at least in part on the RSSI of each of the plurality of signals, wherein to establish the first wireless connection between the wireless camera and the vehicle communication system, the vehicle controller is further programmed to:

compare the RSSI of each of the plurality of signals received from the wireless camera to a predetermined RSSI threshold;

determine an RSSI trend for each of the plurality of signals received from the wireless camera in response to determining that the RSSI of each of the plurality of signals received from the wireless camera is greater than or equal to the predetermined RSSI threshold, wherein the RSSI trend includes at least one of: an RSSI increasing trend and an RSSI decreasing trend;

determine a connection intention for the wireless camera to be a connection establish intention in response to determining that the RSSI trend is the RSSI increasing trend;

determine a connection intention for the wireless camera to be a connection terminate intention in response to determining that the RSSI trend is the RSSI decreasing trend;

establish the first wireless connection between the wireless camera and the vehicle communication system using the wireless PAN communication protocol in response to determining that the connection intention is the connection establish intention; and transmit a standby message to the wireless camera in response to determining that the connection intention for wireless camera is the connection terminate intention;

identify an activation condition for the wireless camera in response to receiving a video streaming request;

establish a second wireless connection between the wireless camera and the vehicle communication system using a wireless local area network (LAN) communication protocol in response to identifying the activation condition, wherein at least one connection parameter of the second wireless connection is transmitted using the first wireless connection, wherein to establish the second wireless connection between the wireless camera and the vehicle communication system, the vehicle controller is further programmed to:

transmit at least one connection parameter for the second wireless connection to the wireless camera with the vehicle communication system using the first wireless connection, wherein the at least one connection parameter includes at least one of: a service set identifier (SSID), a network security type, and a network security key;

receive a video stream from the wireless camera using the vehicle communication system; and display the video stream using the vehicle display.

* * * * *